US012607481B2

(12) United States Patent
Wu et al.

(10) Patent No.: US 12,607,481 B2
(45) Date of Patent: Apr. 21, 2026

(54) MOBILE ROBOT MAP CONSTRUCTION METHOD AND APPARATUS, AND COMPUTER DEVICE AND STORAGE MEDIUM

(71) Applicant: Beijing Robint Technologies Co., Ltd., Beijing (CN)

(72) Inventors: Xinkai Wu, Beijing (CN); Xiang Huo, Beijing (CN); Tao Song, Beijing (CN); Shan He, Beijing (CN); Ziying Yao, Beijing (CN)

(73) Assignee: Beijing Robint Technologies Co., Ltd., Beijing (CN)

( * ) Notice: Subject to any disclaimer, the term of this patent is extended or adjusted under 35 U.S.C. 154(b) by 160 days.

(21) Appl. No.: 18/256,909

(22) PCT Filed: Dec. 22, 2020

(86) PCT No.: PCT/CN2020/138193
§ 371 (c)(1),
(2) Date: Jun. 9, 2023

(87) PCT Pub. No.: WO2022/133697
PCT Pub. Date: Jun. 30, 2022

(65) Prior Publication Data
US 2024/0094028 A1 Mar. 21, 2024

(51) Int. Cl.
*G01C 21/00* (2006.01)

(52) U.S. Cl.
CPC .................................. *G01C 21/3841* (2020.08)

(58) Field of Classification Search
CPC .............. G01C 21/3841; G01C 21/005; G01C 21/383; G01C 21/3848; G01C 21/206; G06T 17/05
See application file for complete search history.

(56) References Cited

U.S. PATENT DOCUMENTS

2018/0314254 A1* 11/2018 Bauer .................. G01C 21/206
2019/0064832 A1 2/2019 Tang
(Continued)

FOREIGN PATENT DOCUMENTS

CN 108665541 A 10/2018
CN 109250593 A * 1/2019 ............... B66B 1/06
(Continued)

OTHER PUBLICATIONS

Machine Translation of CN-109250593-A (Year: 2019).*
(Continued)

*Primary Examiner* — Sahar Motazedi
(74) *Attorney, Agent, or Firm* — Muncy, Geissler, Olds & Lowe, P.C.

(57) ABSTRACT

A mobile robot map construction method and apparatus, and a computer device and a storage medium. The mobile robot map construction method comprises: acquiring the number of floors and current floor information (S202); acquiring point cloud data of an environment around the current location by means of a laser radar, acquiring image data of the environment around the current location by means of a camera, and constructing an environment map according to the point cloud data and the image data and labeling a glass location (S204); determining whether there is an area to be detected in the environment map, and if there is an area to be detected, detecting said area according to a pre-set rule (S206); and if there is no area to be detected, moving to the nearest elevator in an obstacle avoidance mode according to an elevator location marked on the environment map, and taking the elevator to an undetected floor until environment map construction of all undetected floors is completed (S208). Glass is recognized by means of point cloud data and image data, such that recognition accuracy is increased.

7 Claims, 4 Drawing Sheets

(56) References Cited

U.S. PATENT DOCUMENTS

| | | | | |
|---|---|---|---|---|
| 2021/0082132 A1* | 3/2021 | Cheng | ................. | G06V 10/757 |
| 2022/0022716 A1* | 1/2022 | Wu | ....................... | G05D 1/024 |

FOREIGN PATENT DOCUMENTS

| | | | | | |
|---|---|---|---|---|---|
| CN | 109425352 A | | 3/2019 | | |
| CN | 110704140 A | | 1/2020 | | |
| CN | 111728533 A | | 10/2020 | | |
| CN | 112033410 A | | 12/2020 | | |
| CN | 112047214 A | * | 12/2020 | .............. | B66B 1/14 |
| CN | 112051847 A | | 12/2020 | | |
| JP | 2007249632 A | * | 9/2007 | | |
| WO | WO-2022041343 A1 | * | 3/2022 | ........... | G05D 1/0221 |

OTHER PUBLICATIONS

Machine Translation of CN-112047214-A (Year: 2020).*
Machine Translation of JP-2007249632-A (Year: 2007).*
Machine Translation of WO-2022041343-A1 (Year: 2022).*
International Search Report in International Application No. PCT/CN2020/138193—mailed on Sep. 24, 2021.
English Translation of the Written Opinion of the International Searching Authority in International Application No. PCT/CN2020/138193—mailed on Sep. 24, 2021.

* cited by examiner

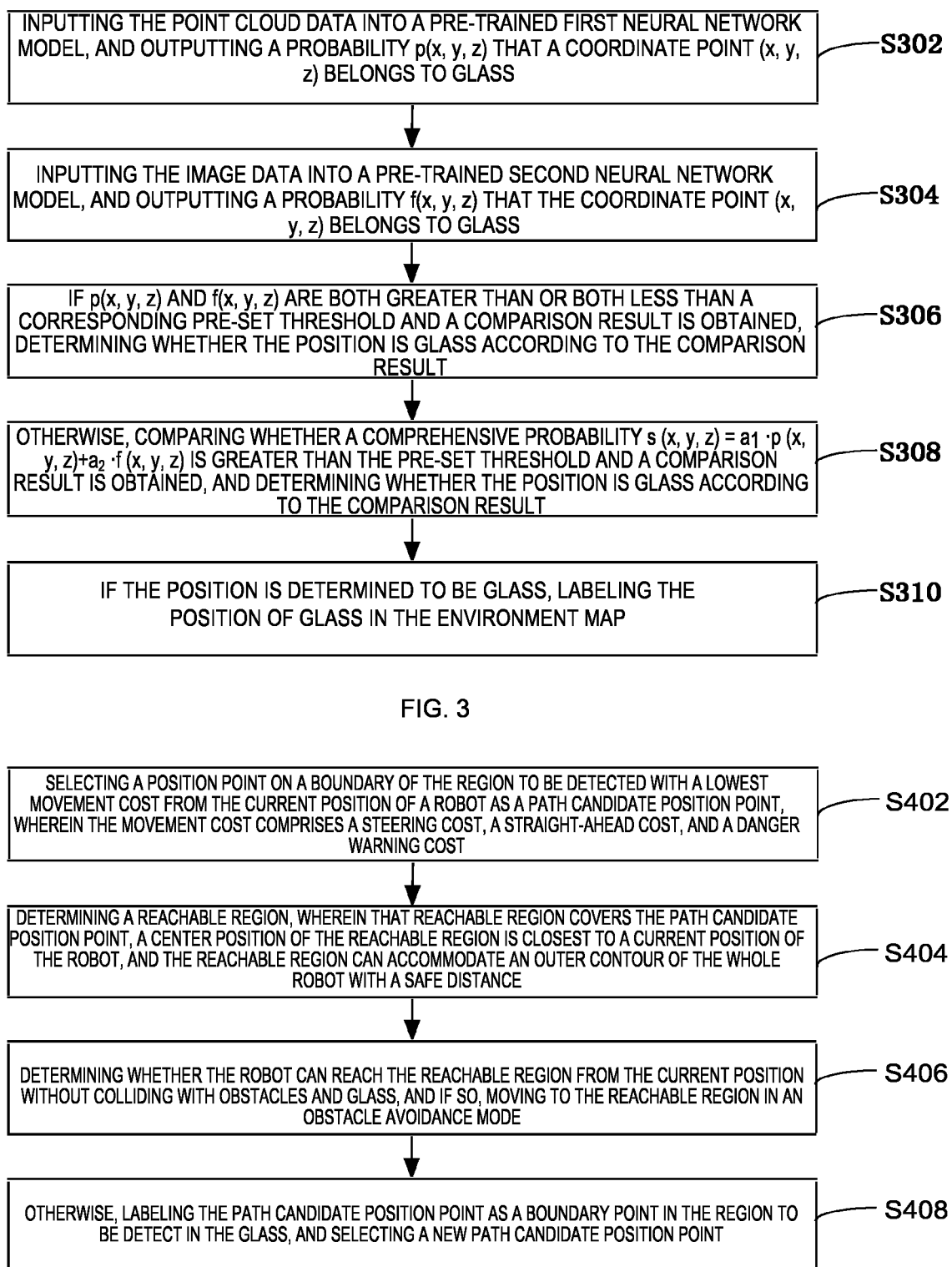

INPUTTING THE POINT CLOUD DATA INTO A PRE-TRAINED FIRST NEURAL NETWORK MODEL, AND OUTPUTTING A PROBABILITY p(x, y, z) THAT A COORDINATE POINT (x, y, z) BELONGS TO GLASS — S302

INPUTTING THE IMAGE DATA INTO A PRE-TRAINED SECOND NEURAL NETWORK MODEL, AND OUTPUTTING A PROBABILITY f(x, y, z) THAT THE COORDINATE POINT (x, y, z) BELONGS TO GLASS — S304

IF p(x, y, z) AND f(x, y, z) ARE BOTH GREATER THAN OR BOTH LESS THAN A CORRESPONDING PRE-SET THRESHOLD AND A COMPARISON RESULT IS OBTAINED, DETERMINING WHETHER THE POSITION IS GLASS ACCORDING TO THE COMPARISON RESULT — S306

OTHERWISE, COMPARING WHETHER A COMPREHENSIVE PROBABILITY $s(x, y, z) = a_1 \cdot p(x, y, z) + a_2 \cdot f(x, y, z)$ IS GREATER THAN THE PRE-SET THRESHOLD AND A COMPARISON RESULT IS OBTAINED, AND DETERMINING WHETHER THE POSITION IS GLASS ACCORDING TO THE COMPARISON RESULT — S308

IF THE POSITION IS DETERMINED TO BE GLASS, LABELING THE POSITION OF GLASS IN THE ENVIRONMENT MAP — S310

FIG. 3

SELECTING A POSITION POINT ON A BOUNDARY OF THE REGION TO BE DETECTED WITH A LOWEST MOVEMENT COST FROM THE CURRENT POSITION OF A ROBOT AS A PATH CANDIDATE POSITION POINT, WHEREIN THE MOVEMENT COST COMPRISES A STEERING COST, A STRAIGHT-AHEAD COST, AND A DANGER WARNING COST — S402

DETERMINING A REACHABLE REGION, WHEREIN THAT REACHABLE REGION COVERS THE PATH CANDIDATE POSITION POINT, A CENTER POSITION OF THE REACHABLE REGION IS CLOSEST TO A CURRENT POSITION OF THE ROBOT, AND THE REACHABLE REGION CAN ACCOMMODATE AN OUTER CONTOUR OF THE WHOLE ROBOT WITH A SAFE DISTANCE — S404

DETERMINING WHETHER THE ROBOT CAN REACH THE REACHABLE REGION FROM THE CURRENT POSITION WITHOUT COLLIDING WITH OBSTACLES AND GLASS, AND IF SO, MOVING TO THE REACHABLE REGION IN AN OBSTACLE AVOIDANCE MODE — S406

OTHERWISE, LABELING THE PATH CANDIDATE POSITION POINT AS A BOUNDARY POINT IN THE REGION TO BE DETECT IN THE GLASS, AND SELECTING A NEW PATH CANDIDATE POSITION POINT — S408

FIG. 4

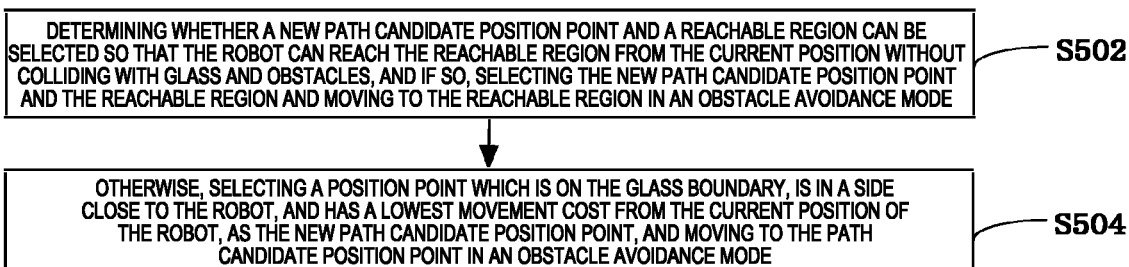

DETERMINING WHETHER A NEW PATH CANDIDATE POSITION POINT AND A REACHABLE REGION CAN BE SELECTED SO THAT THE ROBOT CAN REACH THE REACHABLE REGION FROM THE CURRENT POSITION WITHOUT COLLIDING WITH GLASS AND OBSTACLES, AND IF SO, SELECTING THE NEW PATH CANDIDATE POSITION POINT AND THE REACHABLE REGION AND MOVING TO THE REACHABLE REGION IN AN OBSTACLE AVOIDANCE MODE — S502

OTHERWISE, SELECTING A POSITION POINT WHICH IS ON THE GLASS BOUNDARY, IS IN A SIDE CLOSE TO THE ROBOT, AND HAS A LOWEST MOVEMENT COST FROM THE CURRENT POSITION OF THE ROBOT, AS THE NEW PATH CANDIDATE POSITION POINT, AND MOVING TO THE PATH CANDIDATE POSITION POINT IN AN OBSTACLE AVOIDANCE MODE — S504

FIG. 5

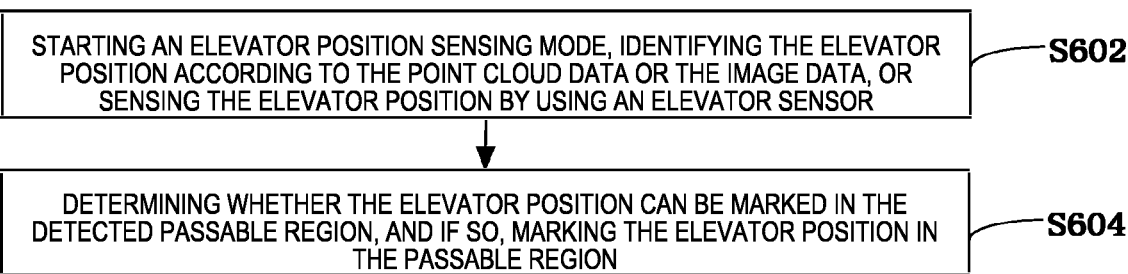

STARTING AN ELEVATOR POSITION SENSING MODE, IDENTIFYING THE ELEVATOR POSITION ACCORDING TO THE POINT CLOUD DATA OR THE IMAGE DATA, OR SENSING THE ELEVATOR POSITION BY USING AN ELEVATOR SENSOR — S602

DETERMINING WHETHER THE ELEVATOR POSITION CAN BE MARKED IN THE DETECTED PASSABLE REGION, AND IF SO, MARKING THE ELEVATOR POSITION IN THE PASSABLE REGION — S604

FIG. 6

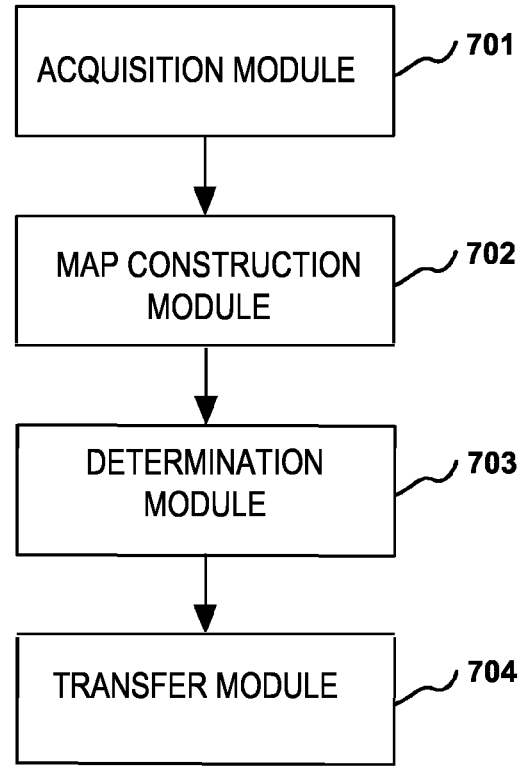

ACQUISITION MODULE — 701

MAP CONSTRUCTION MODULE — 702

DETERMINATION MODULE — 703

TRANSFER MODULE — 704

FIG. 7

MOBILE ROBOT MAP CONSTRUCTION METHOD AND APPARATUS, AND COMPUTER DEVICE AND STORAGE MEDIUM

TECHNICAL FIELD

The present invention relates to the technical field of robot map construction, in particular to a mobile robot map construction method and apparatus, computer device and storage medium.

BACKGROUND

At present, intelligent mobile robots are increasingly widely used in various industries and/or in all walks of life. With the advent of the intelligent era, it is urgently necessary for robots to construct environment maps involving multi-floor complex scenes efficiently and accurately without human intervention.

At present, a multi-floor environment map is usually constructed by making robots traverse the whole floor by trial and error to realize constructing the floor environment map; and then the robot is manually transferred to the next floor to complete constructing the environment map of the next floor. It takes a long time and is inefficient to traverse the floors by trial and error. However, an intervention with an operator is necessary for manually transfer the robot to the next floor, therefore, the robot could not be automatically transferred between floors. In addition, for the position where there is glass in the floor, the prior art treats the glass in the floor as an ordinary obstacle when constructing the floor environment map, and ignores a possible region behind the glass that may be necessary to construct the environment map.

Therefore, the prior art does not have a complete solution for constructing an environment map with multi-floor scenes and glass interferences in floors, and thus improvements are needed.

SUMMARY

In view of the above, it is necessary to provide a mobile robot map construction method and apparatus, computer device and storage medium to solve the above problems.

The embodiment of the present disclosure is realized as follows: a mobile robot map construction method, comprising steps of:

acquiring a number of floors and current floor information;

acquiring point cloud data of an environment around a current position via a laser radar, acquiring image data of the environment around the current position via a camera, and constructing an environment map and labeling a position of glass according to the point cloud data and the image data, wherein the environment map comprises an obstacle region, a passable region, and a region to be detected, wherein the position of glass is located in the passable region;

determining whether there is a region to be detected in the environment map, and if there is a region to be detected, detecting the region to be detected according to a pre-set rule; and if there is no region to be detected, moving to a nearest elevator in an obstacle avoidance mode according to an elevator position labeled on the environment map, and taking the elevator to an undetected floor until finishing constructing the environment map for all undetected floors.

In one embodiment, the present disclosure further provides a mobile robot map construction apparatus, comprising:

an acquisition module configured for acquiring a number of floors and current floor information;

a map construction module configured for acquiring point cloud data of an environment around a current position via a laser radar, acquiring image data of the environment around the current position via a camera, and constructing an environment map and labeling a position of glass according to the point cloud data and the image data, wherein the environment map comprises an obstacle region, a passable region and a region to be detected, wherein the position of glass is located in the passable region;

a determination module configured for determining whether there is a region to be detected in the environment map, and if there is a region to be detected, detecting the region to be detected according to a pre-set rule; and a transfer module configured for, if there is no region to be detected, moving to a nearest elevator in an obstacle avoidance mode according to an elevator position labeled on the environment map, and taking the elevator to an undetected floor until finishing constructing the environment map for all undetected floors.

In one embodiment, the present disclosure further provides a computer device, comprising a memory and a processor, wherein the memory stored a computer program therein, and the computer program, when executed by the processor, causes the processor to execute the steps of the above mobile robot map construction method.

In one embodiment, the present disclosure further provides a computer-readable storage medium, wherein a computer program is stored on the computer-readable storage medium, and the computer program, when executed by a processor, causes the processor to execute the steps of the above mobile robot map construction method.

The mobile robot map construction method provided by the embodiment of the present disclosure constructs an environment map by utilizing the point cloud data and the image data. And glass features can be identified through comprehensive processing of the point cloud data and the image data. Thus, the problem of inaccurate identification of glass features in the prior art is overcome. In addition, the mobile robot map construction method provided by the present disclosure enables the robot to take the elevator to realize automatic cross-floor detection, and this process can realize automatic cross-floor map construction without manual intervention, with high intelligence.

BRIEF DESCRIPTION OF DRAWINGS

FIG. 3 is a concrete flow chart for marking the position of glass according to the point cloud data and the image data in FIG. 2;

FIG. 4 is a specific flowchart of detecting the region to be detected in FIG. 2 according to the pre-set rule;

FIG. 5 is a specific flow chart for selecting a new path candidate position point in FIG. 4;

FIG. 6 is a flowchart of steps further included after step S208 in FIG. 2;

FIG. 7 is a block diagram of a structure of a mobile robot map construction device in an embodiment;

DESCRIPTION OF EMBODIMENTS

In order to make the purpose, technical solution, and advantages of the present disclosure clearer, the present disclosure will be further described in detail with the attached drawings and examples. It should be understood that the specific embodiments described here are only used to explain the present disclosure, and are not used to limit the present disclosure.

It is understood that the terms "first" and "second" used in this application can be used to describe various elements herein, but these elements are not limited by these terms unless otherwise specified. These terms are only used to distinguish the first element from another element. For example, without departing from the scope of this application, a first xx script may be called a second xx script, and similarly, a second xx script may be called a first xx script.

Figure 1:
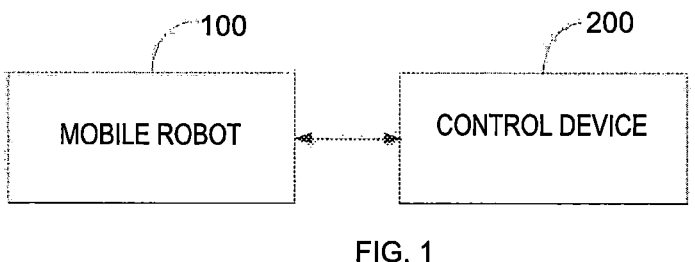
FIG. 1 is an application environment diagram of a mobile robot map construction method provided in an embodiment.

FIG. 1 is an application environment diagram of a mobile robot map construction method provided in one embodiment. As shown in FIG. 1, in this application environment, a mobile robot 100 and a control device 200 are included.

The mobile robot 100 includes mobile components that can be used for moving, devices for data acquisition, such as a laser radar, a camera, etc.; in addition, it can also include an infrared sensor, a communication module, a voice recognition module, etc. This is an optional specific implementation, and the embodiment of the present disclosure does not specifically limit this. It should be understood that the hardware structure of the mobile robot 100 can be varied, and the method of the present disclosure mainly involves the algorithm of the mobile robot 100 in automatic map construction, and the specific hardware settings are not further limited.

In addition, a control device 200 may be included. The control device 200 can communicate with the mobile robot 100, which can be wired or wireless. Through the control device, the operator can operate the mobile robot 100. It should be noted that the operation of the operator may not involve the process of automatic map construction, but only be used for basic operations such as starting and stopping, and the mobile robot 100 can realize constructing cross-floor maps by implementing the map construction method provided by the embodiment of the present disclosure. The composition and specific form of the control device 200 are not specifically limited by the embodiment of the present disclosure.

Figure 2:
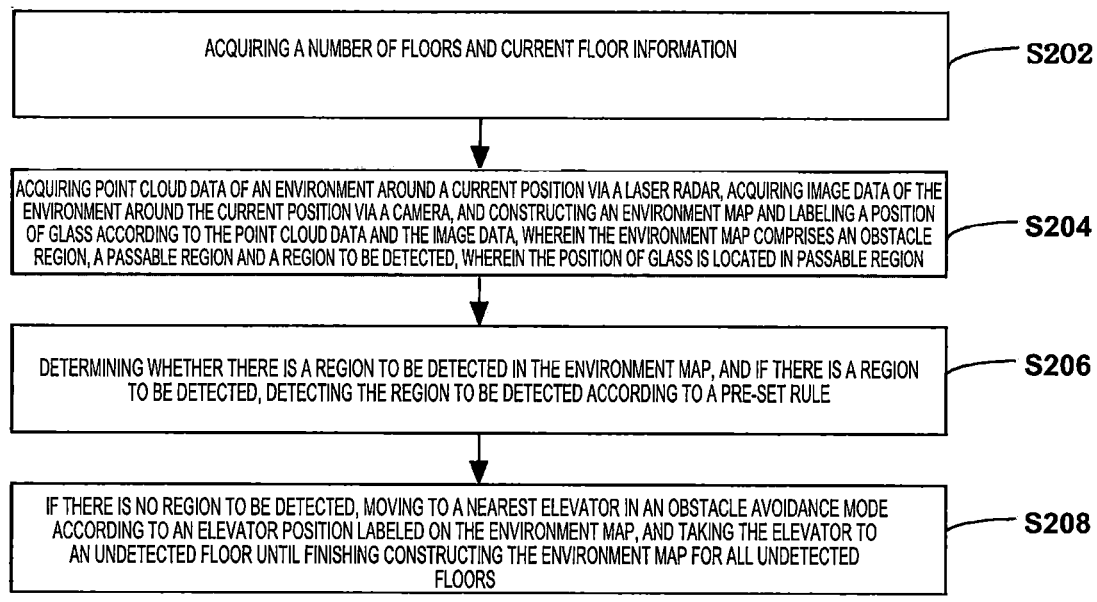
FIG. 2 is a flowchart of a map construction method for a mobile robot in an embodiment.

As shown in FIG. 2, in one embodiment, a mobile robot map construction method is proposed, and this embodiment is mainly illustrated by applying this method to the mobile robot 100 in FIG. 1. Specifically, it can include steps of:

In Step S202, acquiring a number of floors and current floor information.

In the embodiment of the present disclosure, the current floor information includes, but not limited to, the total number of floors, the use of floors, the number and distribution of merchants and households in floors, etc., and such information is mainly used to assist constructing environment maps. In the present disclosure, the number of floors and the information of the current floor can be obtained by the operator input or the mobile robot through wireless communication, and in addition, it can be obtained from the corresponding signs in the floor through image and character recognition.

In Step S204, acquiring point cloud data of an environment around a current position via a laser radar, acquiring image data of the environment around the current position via a camera, and constructing an environment map according to the point cloud data and the image data and labeling a position of glass; the environment map comprises an obstacle region, a passable region, and a region to be detected, wherein the position of glass is located in the passable region.

In the embodiment of the present disclosure, the construction of the environment map needs to combine point cloud data and image data, and the recognition of glass features also needs to combine the processing results of point cloud data and image data. In the embodiment of the present disclosure, the environment map includes an obstacle region, a passable region, and a region to be detected. It should be noted that the three types of regions divided here do not necessarily exist in the constructed environment map at the same time, and the environment map may include one or more types of regions, which is only the division of the types of regions in the environment map by the present disclosure.

In Step S206, whether there is a region to be detected in the environment map is determined, and if there is a region to be detected, detecting the region to be detected according to a pre-set rule.

In the embodiment of the present disclosure, before the detection of the current position is completed, there may be a region to be detected, so it is necessary to detect the region to be detected according to a pre-set rule.

In Step S208, if there is no region to be detected, the robot moves to a nearest elevator in an obstacle avoidance mode according to an elevator position labeled on the environment map, and takes the elevator to an undetected floor until finishing constructing the environment map for all undetected floors.

In the embodiment of the present disclosure, the elevator position on the map environment can be marked before or during constructing the environment map.

The mobile robot map construction method provided by the embodiment of the present disclosure constructs an environment map by utilizing the point cloud data and the image data. And glass features can be identified through comprehensive processing of the point cloud data and the image data, Thus the problem of inaccurate identification of glass features in the prior art is overcome. In addition, the mobile robot map construction method provided by the present disclosure enables the robot to take the elevator to realize automatic cross-floor detection, and this process can realize automatic cross-floor map construction without manual intervention, with high intelligence.

In one embodiment, as shown in FIG. 3, in step S204 of labeling the position of glass according to the point cloud data and the image data, specifically including steps S302-S310.

In Step S302, inputting the point cloud data into a pre-trained first neural network model, and outputting a probability $p(x, y, z)$ that a coordinate point $(x, y, z)$ belongs to glass.

In the embodiment of the present disclosure, the training method of the neural network module can refer to the prior art, and the embodiment of the present disclosure does not specifically limit this. It should be noted that the present disclosure uses the diffuse reflection of glass to make the reflection spectrum appear a specific shape, and it is determined whether an object is glass according to a similarity between the specific shape and the point cloud data collected on site.

In Step S304, inputting the image data into a pre-trained second neural network model, and outputting a probability f(x, y, z) that the coordinate point (x, y, z) belongs to glass.

In the embodiment of the present disclosure, the image data is also processed by the neural network model, and the specific training process of the neural network model is not specifically limited in the embodiment of the present disclosure.

In step S306, if p(x, y, z) and f(x, y, z) are both greater than or both less than a corresponding pre-set threshold and a comparison result is obtained, determining whether the position is glass according to the comparison result.

In the embodiment of the present disclosure, it should be noted that the pre-set thresholds corresponding to the two probabilities may be the same or different, and there is no direct relationship between them. According to the comparison result, it is determined whether the position is glass or not. Specifically, if the two probabilities are both greater than or both less than the corresponding pre-set threshold, it means that the determination results obtained by the two methods are the same and can be mutually confirmed, so it can be determined whether the position is glass or not.

In Step S308, otherwise, whether a comprehensive probability s(x, y, z)=a$_1$·p(x, y, z)+a$_2$·f(x, y, z) is greater than the pre-set threshold is compared and a comparison result is obtained, and determining whether the position is glass according to the comparison result;

In the embodiment of the present disclosure, different from the previous step, if the determination results by two probabilities are different and the two determination methods cannot be mutually confirmed, a comprehensive probability is determined by the above formula, and whether the target position belongs to the glass is determined by the relationship between the comprehensive probability and its pre-set threshold. This method makes up for a deficiency of an independent evaluation.

In Step S310, if the position is determined to be glass, the position of glass is labeled in the environment map;

where s(x, y, z) is the comprehensive probability of the coordinate point (x, y, z), a$_1$, a$_2$ are pre-set coefficients, p(x, y, z) is the probability that the position is glass calculated from the point cloud data, and f(x, y, z) is the probability that the position is glass calculated from the image data.

In the embodiment of the present disclosure, the position of glass is marked in the environment map, and the marking method can be annotative, for example, it can be explained by words, and the pre-set images and models of glass features can also be called and displayed in the environment map.

The mobile robot map construction method provided by the embodiment of the present disclosure uses point cloud data and image data to identify the glass, which can improve the accuracy of glass identification.

In one embodiment, as shown in FIG. 4, in step S206, the region to be detected is detected according to the pre-set rule, which may specifically include steps S402-S408.

In Step S402, selecting a position point on a boundary of the region to be detected with a lowest movement cost from the current position of a robot, as a path candidate position point; the movement cost comprises a steering cost, a straight-ahead cost, and a danger warning cost.

In the embodiment of the present disclosure, the movement cost is determined according to the following formula:

$$F(x)=\alpha_d·d(x,O)+a\omega·\omega(x,O)+\alpha_g·g(x)$$

where F(x) is the movement cost of a x$^{th}$ boundary position point of the region to be detected, $\alpha_d$ is a distance weight parameter pre-set by a system, d(x, O) is a linear distance between the x$^{th}$ boundary position point of the region to be detected and the current position of the robot, a$_\omega$ is a steering weight parameter pre-set by the system, $\omega$(x, O) is a steering angle of the x$^{th}$ boundary position point of the region to be detected from the current position of the robot, a g is a danger warning weight parameter pre-set by the system, and g(x) is a nearest distance from the x$^{th}$ boundary position point of the region to be detected to a boundary of a detected obstacle.

In Step S404, determining a reachable region, wherein that reachable region covers the path candidate position point, a center position of the reachable region is closest to a current position of the robot, and the reachable region can accommodate an outer contour of the whole robot with a safe distance.

In the embodiment of the present disclosure, the size of the safety distance can be set by itself.

In Step S406, determining whether the robot can reach the reachable region from the current position without colliding with obstacles and glass, and if so, the robot moves to the reachable region in an obstacle avoidance mode;

In the embodiment of the present disclosure, the determination process can be combined with the pre-constructed environment map, such as the hypothetical planning of the path in the constructed environment map.

In Step S408, otherwise, labeling the path candidate position point as a boundary point in the region to be detect in the glass, and selecting a new path candidate position point.

In one embodiment, as shown in FIG. 5, a new path candidate position point is selected in step S408, which may specifically include steps S502-S504.

In Step S502, determining whether a new path candidate position point and a reachable region can be selected so that the robot can reach the reachable region from the current position without colliding with glass and obstacles, and if so, the new path candidate position point and the reachable region are selected and the robot moves to the reachable region in an obstacle avoidance mode.

In Step S504, otherwise, selecting a position point which is on the glass boundary, is in a side close to the robot, and has a lowest movement cost from the current position of the robot, as the new path candidate position point, and the robot moves to the path candidate position point in an obstacle avoidance mode.

In the embodiment of the present disclosure, the determination of movement cost refers to the aforementioned embodiment, and the mode of avoiding obstacles can be realized by referring to the prior art, which is not specifically limited in the embodiment of the present disclosure.

In one embodiment, as shown in FIG. 6, before step S208, steps S602-S604 may be specifically included.

In Step S602, starting an elevator position sensing mode, identifying the elevator position according to the point cloud data or the image data, or sensing the elevator position by using an elevator sensor;

In the embodiment of the present disclosure, the elevator sensor can be used to sense the elevator position, specifically, the elevator is equipped with a near-field signal transmitter, and the robot is equipped with a near-field signal receiver, so that the mobile robot can sense the elevator by sending and receiving the near-field signal.

In Step S604, determining whether the elevator position can be marked in the detected passable region, and if so, marking the elevator position in the passable region.

In one embodiment, before the step of moving to a nearest elevator in an obstacle avoidance mode according to an elevator position labeled on the environment map, and taking the elevator to an undetected floor in Step 208, the following steps S702-S708 are included.

In Step 702, when there are a plurality of undetected floors, labeling the undetected floors with $\{1, 2, \ldots, R\}$, where R is a number of currently undetected floors, and $\{e_1, e_2, \ldots, e_R\}$ is a floor number difference between each undetected floor and the floor where the robot is currently located.

In Step 704, selecting an undetected floor corresponding to the smallest floor number difference, as a floor to be reached.

In Step 706, setting the current position as $(x_o, y_o)$, and setting the numbers of the elevators in a current floor are set as $\{1, 2, \ldots, N\}$, where N is a total number of elevators in the current floor, $\{d_1, d_2, \ldots, d_N\}$ is a path distance from the current position to the elevators/elevator in the current floor, and $\{t_1, t_2, \ldots, t_N\}$ is a time when a carriage of each elevator in the current floor reaches the current floor.

In Step 708, calculating a priority decision value of the robot taking elevators according to the following formula to determine a preferred elevator:

$$Q_n = \frac{1}{\dfrac{d_n}{v} + t_n}$$

where $Q_n$ is a priority decision value for the robot to take a $n^{th}$ elevator on the current floor, where $n \in \{1, 2, \ldots, N\}$, $d_n$ is a path distance from the current position of the robot to the $n^{th}$ elevator on the current floor, v is a speed set for the robot, and $t_n$ is a time when the carriage of the $n^{th}$ elevator on the current floor reaches the current floor.

In the embodiment of the present disclosure, a priority decision of taking elevators is determined by the above formula, which can shorten the time to reach the undetected floor and reduce the movement cost of the mobile robot.

As shown in FIG. 7, in one embodiment, a mobile robot map construction apparatus is provided, which can be integrated in the above-mentioned mobile robot 100, and specifically includes:

an acquisition module 701 configured for acquiring a number of floors and current floor information;

a map construction module 702 configured for acquiring point cloud data of an environment around a current position via a laser radar, acquiring image data of the environment around the current position via a camera, and constructing an environment map and labeling a position of glass according to the point cloud data and the image data, wherein the environment map comprises an obstacle region, a passable region and a region to be detected, wherein the position of glass is located in the passable region;

a determination module 703 configured for determining whether there is a region to be detected in the environment map, and if there is a region to be detected, detecting the region to be detected according to a pre-set rule; and a transfer module 704 configured for, if there is no region to be detected, moving to a nearest elevator in an obstacle avoidance mode according to an elevator position labeled on the environment map, and taking the elevator to an undetected floor until finishing constructing the environment map for all undetected floors.

In the embodiment of the present disclosure, please refer to any one or a combination of the above-mentioned embodiments for the explanation of the steps executed by the above-mentioned modules, and the embodiment of the present disclosure will not repeat them here.

The mobile robot map construction apparatus provided by the embodiment of the present disclosure constructs an environment map by utilizing the point cloud data and the image data, and can identify glass features through comprehensive processing of the point cloud data and the image data, thus overcoming the problem of inaccurate identification of glass features in the prior art; in addition, the mobile robot map construction method provided by the present disclosure enables the robot to take the elevator to realize automatic cross-floor detection, and this process can realize automatic cross-floor map construction without manual intervention, with high intelligence.

Figure 8:
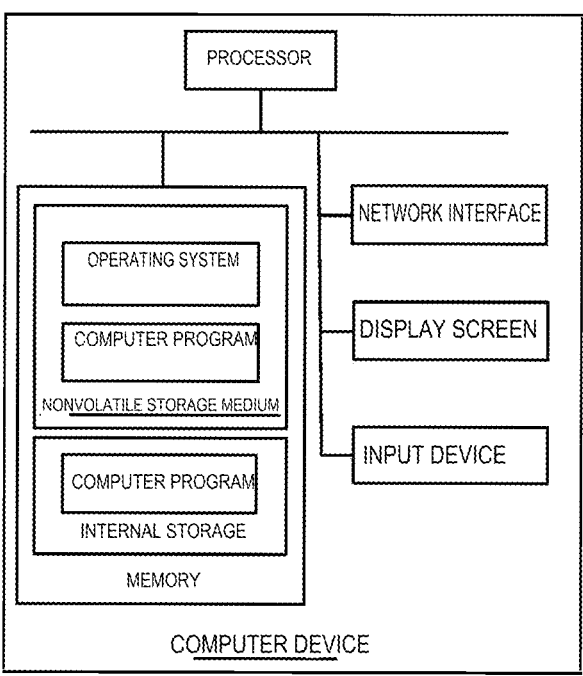
FIG. 8 is a block diagram of an internal structure of a computer device in an embodiment.

FIG. 8 shows an internal structure diagram of a computer device in one embodiment. The computer device can be a mobile robot 100 in FIG. 1. As shown in FIG. 8, the computer device includes a processor, a memory, a network interface, an input device and a display screen connected through a system bus. The memory includes a nonvolatile storage medium and an internal storage. The nonvolatile storage medium of the computer device stores an operating system and a computer program. When the computer program is executed by the processor, the processor can implement the mobile robot map construction method provided by the embodiment of the present disclosure. The internal storage can also store a computer program, which, when executed by the processor, can make the processor execute the mobile robot map construction method provided by the embodiment of the present disclosure. The display screen of the computer device can be a liquid crystal display screen or an electronic ink display screen, and the input device of the computer device can be a touch layer covered on the display screen, a button, a trackball or a touchpad arranged on the shell of the computer device, and an external keyboard, touchpad or mouse.

It can be understood by those skilled in the art that the structure shown in FIG. 8 is only a block diagram of a part of the structure related to the solution of the present disclosure, and does not constitute a limitation on the computer device to which the solution of the present disclosure is applied. The specific computer device may include more or less components than those shown in the figure, or combine some components, or have different component arrangements.

In one embodiment, the mobile robot map construction device provided by the present disclosure can be realized in the form of a computer program, and the computer program can run on a computer device as shown in FIG. 8. The memory of the computer device can store various program modules that make up the map construction device of the mobile robot, such as the acquisition module, the map construction module, the determination module and the transfer module shown in FIG. 7. The computer program composed of each program module causes the processor to execute the steps in the mobile robot map construction method of each embodiment of the application described in this specification.

For example, the computer device shown in FIG. 8 can execute step S202 through the acquisition module in the mobile robot map construction device shown in FIG. 7; the computer device may execute step S204 through the map construction module; the computer device can execute step S206 through the determination module; the computer device may execute step S208 through the transfer module.

In one embodiment, a computer device is proposed, which includes a memory, a processor and a computer program stored in the memory and executable on the processor, and the processor implements the following steps when executing the computer program:

acquiring a number of floors and current floor information;

acquiring point cloud data of an environment around a current position via a laser radar, acquiring image data of the environment around the current position via a camera, and constructing an environment map and labeling a position of glass according to the point cloud data and the image data, wherein the environment map comprises an obstacle region, a passable region and a region to be detected, wherein the position of glass is located in the passable region;

determining whether there is a region to be detected in the environment map, and if there is a region to be detected, detecting the region to be detected according to a pre-set rule; and if there is no region to be detected, moving to a nearest elevator in an obstacle avoidance mode according to an elevator position labeled on the environment map, and taking the elevator to an undetected floor until finishing constructing the environment map for all undetected floors.

In one embodiment, a computer-readable storage medium is provided, on which a computer program is stored, which, when executed by a processor, causes the processor to perform steps of:

acquiring a number of floors and current floor information;

acquiring point cloud data of an environment around a current position via a laser radar, acquiring image data of the environment around the current position via a camera, and constructing an environment map and labeling a position of glass according to the point cloud data and the image data, wherein the environment map comprises an obstacle region, a passable region and a region to be detected, wherein the position of glass is located in the passable region;

determining whether there is a region to be detected in the environment map, and if there is a region to be detected, detecting the region to be detected according to a pre-set rule; and if there is no region to be detected, moving to a nearest elevator in an obstacle avoidance mode according to an elevator position labeled on the environment map, and taking the elevator to an undetected floor until finishing constructing the environment map for all undetected floors.

It should be understood that although each step in the flowchart of each embodiment of the present disclosure is displayed in sequence as indicated by the arrow, these steps are not necessarily executed in sequence as indicated by the arrow. Unless explicitly stated in this article, the execution of these steps is not strictly limited in order, and these steps can be executed in other orders. Moreover, at least a part of the steps in each embodiment may include a plurality of sub-steps or stages, which may not necessarily be completed at the same time, but may be executed at different times, and the execution order of these sub-steps or stages may not necessarily be sequentially executed, but may be alternately or alternatively executed with other steps or at least a part of sub-steps or stages of other steps.

Those skilled in the art can understand that all or part of the processes in the method for realizing the above-mentioned embodiments can be completed by instructing related hardware through a computer program, which can be stored in a nonvolatile computer-readable storage medium, and when executed, the program can include the processes of the above-mentioned embodiments. Among them, any reference to memory, storage, database or other media used in the embodiments provided in this application may include nonvolatile and/or volatile memory. The nonvolatile memory may include read-only memory (ROM), programmable ROM (PROM), electrically programmable ROM (EPROM), electrically erasable programmable ROM (EEPROM) or flash memory. The volatile memory may include random access memory (RAM) or external cache memory. By way of illustration without limitation, RAM is available in various forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), Rambus direct RAM (RDRAM), and Direct Rambus RAM (DRDRAM), and Rambus dynamic RAM (RDRAM).

The technical features of the above-mentioned embodiments can be combined arbitrarily. In order to make the description concise, not all possible combinations of the technical features in the above-mentioned embodiments are described. However, as long as there is no contradiction between the combinations of these technical features, they should be considered as the scope recorded in this specification.

The above-mentioned embodiments only express several embodiments of the present disclosure, and their descriptions are more specific and detailed, but they cannot be understood as limiting the patent scope of the present disclosure. It should be pointed out that for those skilled in the art, without departing from the concept of the present disclosure, a number of variations and improvements can be made, which are within the scope of protection of the present disclosure. Therefore, the scope of protection of the patent of this present invention should be based on the appended claims.

What is claimed is:

1. A mobile robot map construction method, comprising steps of:

acquiring a number of floors and current floor information;

acquiring point cloud data of an environment around a current position via a laser radar, acquiring image data of the environment around the current position via a camera, and constructing an environment map and labeling a position of glass according to the point cloud data and the image data, wherein the environment map comprises an obstacle region, a passable region, and a region to be detected, wherein the position of glass is located in the passable region;

determining whether there is a region to be detected in the environment map, and when there is a region to be detected, detecting the region to be detected according to a pre-set rule; and when there is no region to be detected, moving to a nearest elevator in an obstacle avoidance mode according to an elevator position labeled on the environment map, and taking the elevator to an undetected floor until finishing constructing the environment map for all undetected floors, wherein the step of labeling the position of glass according to the point cloud data and the image data specifically comprises steps of:

inputting the point cloud data into a pre-trained first neural network model, and outputting a probability $p(x, y, z)$ that a coordinate point $(x, y, z)$ belongs to glass;

inputting the image data into a pre-trained second neural network model, and outputting a probability $f(x, y, z)$ that the coordinate point $(x, y, z)$ belongs to glass;

when $p(x, y, z)$ and $f(x, y, z)$ are both greater than or both less than a corresponding pre-set threshold and a comparison result is obtained, determining whether the position is glass according to the comparison result;

otherwise, comparing whether a comprehensive probability $s(x, y, z)=a_1 \cdot p(x, y, z)+a_2 \cdot f(x, y, z)$ is greater than the pre-set threshold, obtaining a comparison result, and determining whether the position is glass according to the obtained comparison result; and when the position is determined to be glass, labeling the position of glass in the environment map, where $s(x, y, z)$ is the comprehensive probability of the coordinate point $(x, y, z)$, $a_1$, $a_2$ are pre-set coefficients, $p(x, y, z)$ is the probability that the position is glass calculated from the point cloud data, and $f(x, y, z)$ is the probability that the position is glass calculated from the image data.

2. The mobile robot map construction method according to claim 1, wherein detecting the region to be detected according to the pre-set rule specifically comprises steps of:

selecting a position point on a boundary of the region to be detected with a lowest movement cost from the current position of a robot as a path candidate position point, wherein the movement cost comprises a steering cost, a straight-ahead cost, and a danger warning cost;

determining a reachable region, wherein the reachable region covers the path candidate position point, a center position of the reachable region is closest to the current position of the robot, and the reachable region can accommodate an outer contour of the robot with a safe distance;

determining whether the robot can reach the reachable region from the current position without colliding with obstacles and glass, and when the robot can reach the reachable region without colliding with obstacles and glass, moving to the reachable region in the obstacle avoidance mode;

otherwise, labeling the path candidate position point as a boundary point in the region to be detected behind the glass, and selecting a new path candidate position point.

3. The mobile robot map construction method according to claim 2, wherein the step of selecting the new path candidate position point specifically comprises steps of:

determining whether a new path candidate position point and a new reachable region can be selected so that the robot can reach the new reachable region from the current position without colliding with glass and obstacles, and when the new path candidate position point and the new reachable region can be selected, selecting the new path candidate position point and the new reachable region and moving to the new reachable region in the obstacle avoidance mode;

otherwise, selecting a position point which is on a boundary of the glass, is in a side close to the robot, and has a lowest movement cost from the current position of the robot, as an other new path candidate position point, and moving to the other new path candidate position point in the obstacle avoidance mode.

4. The mobile robot map construction method according to claim 2, wherein the movement cost is determined according to the following formula:

$$F(x)=ad \cdot d(x, O)+\alpha_\omega \cdot \omega(x, O)+\alpha_g \cdot g(x)$$

where $F(x)$ is the movement cost of an $x^{th}$ boundary position point of the region to be detected, $\alpha_d$ is a distance weight parameter pre-set by a system, $d(x, O)$ is a linear distance between the $x^{th}$ boundary position point of the region to be detected and the current position of the robot, $\alpha_\omega$ is a steering weight parameter pre-set by the system, $\omega(x, O)$ is a steering angle of the $x^{th}$ boundary position point of the region to be detected from the current position of the robot, $\alpha_g$ is a danger warning weight parameter pre-set by the system, and $g(x)$ is a nearest distance from the $x^{th}$ boundary position point of the region to be detected to a boundary of a detected obstacle.

5. The mobile robot map construction method according to claim 1, wherein, before the step of when there is no region to be detected, moving to the nearest elevator in the obstacle avoidance mode according to the elevator position labeled on the environment map, and taking the elevator to the undetected floor until finishing constructing the environment map for all undetected floors, the method further comprises steps of:

starting an elevator position sensing mode, identifying the elevator position according to the point cloud data or the image data, or sensing the elevator position by using an elevator sensor;

determining whether the elevator position can be marked in the passable region, and when the elevator position can be marked in the passable region, marking the elevator position in the passable region.

6. A computer device, comprising a memory and a processor, wherein a computer program is stored on the memory, and the computer program, when executed by the processor, causes the processor to execute the steps of the mobile robot map construction method according to claim 1.

7. A non-transitory computer-readable storage medium, wherein a computer program is stored on the computer-readable storage medium, and the computer program, when executed by a processor, causes the processor to execute the steps of the mobile robot map construction method according to claim 1.

* * * * *